Feb. 16, 1943.　　　A. PECHUKAS　　　2,311,466
CHLORINATION OF METAL BEARING MATERIALS
Filed March 15, 1941
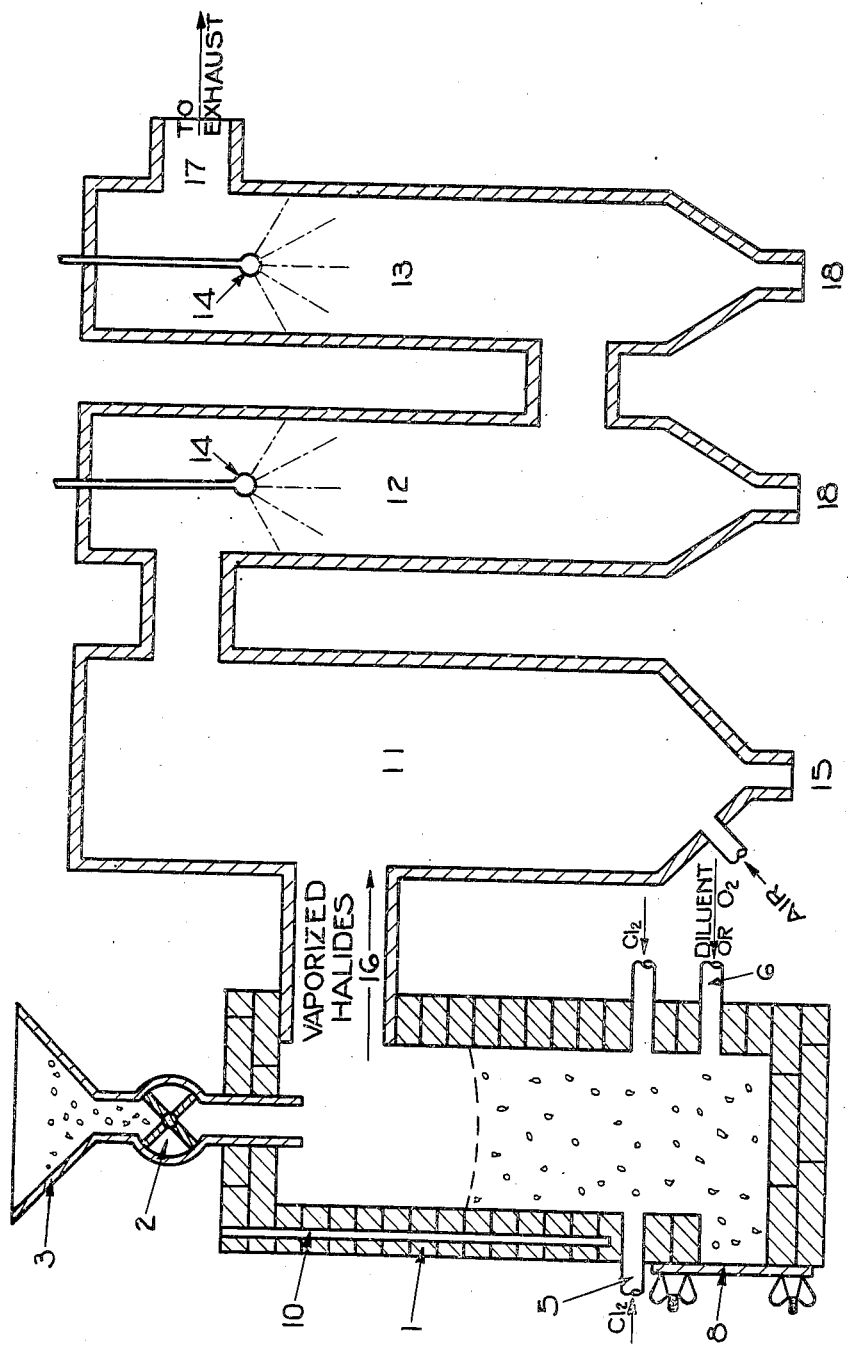
INVENTOR.
ALPHONSE PECHUKAS
BY
ATTORNEY.

Patented Feb. 16, 1943

2,311,466

UNITED STATES PATENT OFFICE 2,311,466

CHLORINATION OF METAL BEARING MATERIALS

Alphonse Pechukas, Akron, Ohio, assignor to Pittsburgh Plate Glass Company, Allegheny County, Pa., a corporation of Pennsylvania Application March 15, 1941, Serial No. 383,577

18 Claims. (Cl. 75—111)

This invention relates to the chlorination of metal bearing materials and to the recovery of metallic halides thereby. More specifically, the invention is directed to the production of metallic halides which have a low vaporization temperature such as the normally liquid halides of metals such as titanium, tin, silicon, germanium, etc. Often these products are prepared by chlorination of materials such as ores or other materials containing large portions of iron, aluminum, and other metals whereby mixtures of vaporized halides are obtained. In many cases, these vapors are contaminated with dust, particles of ore and other materials which are carried over in the stream of halide vapors from the chlorination zone.

Condensation of these halides to recover a purified product has been found to be difficult. For example, in the chlorination of tin or titanium bearing materials a mixture of iron chloride and tin or titanium tetrachloride may be formed and vaporized. Attempts to fractionally condense these halides has been found to be exceedingly difficult for the reason that the entire condenser system rapidly becomes plugged with condensed iron chloride, thus preventing satisfactory operation.

In accordance with the present invention, I have been able to avoid such objectionable plugging of the condenser system and to operate in a manner such that iron chloride or other chlorides such as chromium or aluminum chloride, iron oxide and/or other materials suspended in the vaporized tetrahalide may be removed and the tetrachloride recovered in an effective manner. I have found that it is possible to remove suspended particles in the tetrachloride vapors by washing the vapor mixture with a liquid halide, preferably a metallic liquid halide. For example, a vaporized mixture of iron-chloride and stannic chloride may be cooled by suitable means to cause condensation of iron chloride, and the solid iron chloride washed from the gaseous mixture containing more or less stannic chloride vapor with liquid stannic chloride or carbon tetrachloride, titanium tetrachloride or silicon tetrachloride or other halide which is liquid at the temperature of operation.

In accordance with a further modification the vaporized halides may be treated with air or oxygen to cause oxidation of some or all of the iron chloride. Thereafter, the iron oxide may be removed from the unreacted stannic chloride by washing with a liquid halide. Other solid particles which may be present may be removed in the same manner.

The chlorination of ores and production of the vapor mixture may be conducted by suitable methods such as the method described in copending application of Irving E. Muskat, Serial No. 371,977, filed December 27, 1940, in respect to tin ores, or by the method described in United States Letters Patent No. 2,184,887, granted to Irving E. Muskat on December 26, 1939. In accordance with the methods therein described a tin or titanium bearing material is chlorinated in a suitable furnace such as a shaft furnace to form vaporized chlorides.

The invention will be more fully understood by reference to the accompanying drawing which is a diagrammatic sectional view of a suitable illustration of my invention. The apparatus comprises a suitable shaft furnace 1, constructed of firebrick or other resistant material connected to a plurality of oxidizing and/or condensing chambers 11, 12, and 13. The furnace is provided with chlorine tuyères 5, oxygen or inert gas tuyères 6, and a conduit 16, for the chloride vapors. A suitable storage hopper 3, equipped with a star feeder 2, is mounted upon the top of the furnace. The furnace is also provided with a suitable means, such as a door 8, located in a lower portion thereof, for withdrawing unchlorinated residue.

In the normal operation of the invention, a carbonaceous material may be burned within the furnace or other means may be used to preheat the furnace to a suitable temperature, for example 700° C. or above, and thereafter, a mixture of ore with or without a suitable carbonaceous material such as coke, coal, charcoal, carbon monoxide, etc. is introduced and chlorine introduced through the tuyères to initiate the reaction. Ore and chlorine and/or oxygen, if desired, are introduced into the furnace at predetermined rates and the chlorination is conducted in a continuous manner. When tin or titanium ores are treated the gaseous vapor which is produced contains tin and iron chloride, or titanium chloride and iron chloride, as the case may be, together with more or less dust particles blown over from the furnace. This vapor mixture is then introduced into a suitable chamber 11, wherein the vapors may be permitted to cool to permit a condensation of at least a portion of the iron chloride, for example, to 75° C. or above. Some precipitated iron chloride may settle to the base of the chamber and be withdrawn at 15. If desired, some stannic chloride or titanium tetrachloride may be condensed with the iron in order to promote separation of iron chloride as described in an application of Irving E. Muskat, Serial No. 371,977, filed December 27, 1940, and an application of Irving E. Muskat and Robert H. Taylor, Serial No. 333,361, filed May 4, 1940. Thereafter, the mixture containing tin chloride vapor and suspended solid iron chloride is introduced into washing chamber 12, which may be a packed tower containing carbon Raschig rings, silver beads, etc., where it is further cooled, if necessary, to complete condensation of iron chloride and is washed with a suitable liquid chloride such as liquid stannic chloride by means of one or more sprays 14, or other liquid washing means. In this manner, the suspended iron chloride is condensed and washed from the stannic chloride vapor and is carried out of the chamber through outlet 18, together with the liquid stannic chloride. This mixture may be filtered, decanted, distilled or otherwise treated to remove liquid stannic chloride which may be recycled to the sprayhead 14. The washed gases containing stannic chloride vapor are delivered to condenser 13, where they are cooled to a suitable temperature, for example, 0° C., and washed with cold stannic chloride in order to condense stannic chloride. Thereafter the uncondensed gases substantially denuded of stannic chloride may be discarded.

The temperature of washing the vaporized halides to remove suspended solids is dependent largely upon the amount of tin or titanium halide present in the vapor state. Generally, the temperature in column 12 is maintained sufficiently high to inhibit condensation of a major portion of the titanium or tin chloride in the vapor whereby the suspended solids are removed while the vaporized tin or titanium chlorides remain largely in the vapor state. If desired, however, a small portion generally not in excess of about 20 percent of the tin or titanium tetrachloride vapor may be condensed to assist removal of the suspended solids. Temperatures of 40 to 75° C. are found to be suitable in most cases.

In accordance with a further modification, air may be introduced into chamber 11, in order to cause formation of a substantial quantity of iron oxide. This conversion of iron chloride to iron oxide occurs at temperatures of 400 to 600° C. without substantial action upon the stannic chloride. Accordingly, substantially all of the iron chloride may be converted to iron oxide by introduction of approximately the stoichiometric quantity of air or oxygen.

The following examples are illustrative:

Example I

Using a furnace having an internal diameter of 15 inches which was preheated to a temperature of 1000° C., briquettes, prepared from a mixture of 100 parts ore containing 20 percent tin and 28 percent iron, 5 parts carbon, and 14 parts molasses were introduced at a rate of 125 pounds per hour and chlorine at 1.25 to 1.50 pounds per minute. The temperature was maintained at 850–1000° C. throughout the experiment. The vapors were withdrawn from the furnace and cooled to 40° C. whereupon 90 percent of the ferric chloride and a portion of the tin tetrachloride were simultaneously condensed. The gaseous mixture containing condensed iron chlorides suspended therein was passed through a spray of liquid tin tetrachloride until all of the solid iron chloride was precipitated. The washed uncondensed vapor was withdrawn at a temperature of 40° C. and cooled to 0° C. to recover tin tetrachloride. The process was carried on continuously for many hours by introducing briquettes at a rate of 125 pounds per hour, chlorine at a rate of 1.25 to 1.50 pounds per minute. No plugging occurred during the entire operation. In addition, the step of washing the vapors resulted in a more complete condensation of ferric chloride. Thus, the liquid tin tetrachloride used not only precipitated the condensed and suspended iron chloride, but also produced a more efficient condensation of the iron chloride vapors.

Example II

The process described in Example I was repeated and air preheated to 500° C. was introduced into chamber 11 in an amount sufficient to oxidize a substantial portion of the iron chloride. Thereafter, the vapor mixture was washed with liquid stannic chloride as described in Example I.

In accordance with a further modification, the vaporized halide may be introduced directly into chamber 12 without preliminarily condensing iron chloride in chamber 11. In such a case chamber 11 may be by-passed, if desired, or may be maintained at a temperature such that only a portion of the iron chloride is condensed. The iron chloride vapors thus contacted with the cool liquid halide are condensed to the solid state and washed from the vapor.

In operation in accordance with the present invention, it is apparent that either vaporized or solid iron chloride may be removed from the vapors of tin or other chloride. Thus, the iron chloride may be present largely as a vapor or as a solid or both solid and vaporized iron chloride may be present. Where vaporized iron chloride is present, it may be almost completely condensed by the liquid halide used for washing the vapor while a major portion of the tin, titanium or similar chloride or halide is retained in the vapor state by proper regulation of the temperature. Likewise, other vaporized mixtures such as mixtures of chromium chloride and tin or titanium chlorides, etc. may be treated to condense the higher boiling halide while retaining the lower boiling halide in the vapor state by washing the mixture while maintaining the temperature such that the lower boiling halide remains in the vapor state.

While the present invention has been described with particular reference to the treatment of vapors containing stannic chloride, it is not specifically limited thereto since it may be applied to the treatment of vapors of various other halides of low boiling point, such as hydrated stannic chloride, titanium, silicon, germanium tetrachlorides, tetrabromides, or tetrafluorides, in order to separate solids such as high boiling halides or oxides, such as those of iron, cobalt, nickel, magnesium, chromium chloride or oxide.

While stannic chloride and titanium tetrachloride are found to be especially effective liquids for the removal of suspended solids from the vapors of the above liquid chlorides or halides, other metallic liquid halides such as silicon tetrachloride or titanium tetrafluoride or tetrabromide may be used. Similarly, certain organic halides such as carbon tetrachloride are found to be effective where the halide is sufficiently stable and is liquid at the temperature of operation. Generally, however, it is desirable to wash a vaporized halide with the corresponding liquid halide to avoid contamination.

Although the present invention has been described with reference to specific details of certain embodiments thereof, it is not intended that such details shall be regarded as limitations upon the scope of the invention except insofar as included in the accompanying claims. This application is a continuation-in-part of my copending application Serial No. 284,561, filed July 14, 1939.

I claim:

1. A method of removing iron chloride from a vaporized mixture of iron chloride and tin tetrachloride which comprises condensing iron chloride from the mixture and washing the resulting vapor containing at least a portion of the iron chloride with liquid tin tetrachloride to precipitate solid iron chloride.

2. A method of conducting the chlorination of an iron tin bearing material while minimizing plugging within the system which comprises chlorinating the material at a temperature above the vaporization point of iron chloride and tin tetrachloride to produce a vaporized mixture of iron and tin, cooling the vapor to condense iron chloride and washing the vapor mixture containing a portion of the iron chloride with liquid tin tetrachloride to remove suspended iron chloride.

3. A method of removing iron chloride from a vaporized mixture of iron chloride and tin tetrachloride which comprises condensing iron chloride in the mixture, washing the vapor mixture containing a portion of the condensed iron chloride with liquid tin tetrachloride to precipitate suspended solid iron chloride and subsequently separating condensed tin tetrachloride from the condensed and precipitated iron chloride by distilling the same in the presence of the washed uncondensed vapors.

4. A method of removing iron chloride from a vaporized mixture of iron chloride and tin halide which comprises condensing iron chloride in the mixture and washing the vapor mixture containing a portion of the iron chloride with liquid tin tetrachloride to precipitate suspended solid iron chloride.

5. A method of removing iron chloride from a vaporized mixture of iron chloride and tin tetrachloride which comprises condensing iron chloride in the mixture and washing the vapor mixture containing at least a portion of the iron chloride with a normally liquid metallic halide to precipitate suspended solid iron chloride.

6. A method of removing iron chloride from a vaporized mixture of iron chloride and tin tetrachloride which comprises condensing iron chloride in the mixture and washing the vapor mixture containing at least a portion of the iron chloride with a normally liquid metallic halide of the group consisting of silicon tetrachloride, stannic chloride, and titanium tetrachloride.

7. A method of removing iron chloride from a vaporized mixture of iron chloride and tin tetrachloride which comprises condensing iron chloride in the mixture and washing the vapor mixture containing at least a portion of the iron chloride with a normally liquid halide to precipitate suspended solid iron chloride.

8. A method of removing iron chloride from a vaporized mixture of iron chloride and tin tetrachloride which comprises condensing iron chloride in the mixture together with a portion of the tetrachloride and washing the vapor mixture containing a portion of the iron chloride with liquid tin tetrachloride to precipitate suspended solid iron chloride, and recovering the washed titanium tetrachloride vapor.

9. A method of removing iron halide from a vaporized mixture of iron chloride and tin halide which comprises condensing iron chloride in the mixture together with a portion of the tin halide and washing the vapor mixture containing a portion of the iron chloride with liquid tin tetrahalide to precipitate suspended solid iron chloride and recovering the washed tin halide vapor.

10. A method of removing suspended solids from a vaporized metallic halide which comprises washing the vapors with a normally liquid halide to remove the suspended solids and subsequently recovering the vaporized halide.

11. A method of removing suspended solids from a vaporized normally liquid metallic halide which comprises washing the vapors with a quantity of the same halide in liquid state to remove the suspended solids and thereafter condensing the washed vapors.

12. A method of removing suspended solids from vaporized stannic chloride which comprises washing the vapors with liquid stannic chloride to remove the suspended solids.

13. A method of conducting the chlorination of a tin bearing material while minimizing plugging within the system which comprises chlorinating the material to form a vaporized mixture of iron and tin chloride, cooling the vapor to condense iron chloride, washing the vapor with a liquid halide and recovering vaporized tin chloride.

14. A method of conducting the chlorination of a material containing an iron and a metal capable of forming a liquid halide while minimizing plugging within the system which comprises chlorinating the material to form a vaporized mixture of iron and a chloride of said metal, cooling the vapor to condense iron chloride, washing the vapor with a liquid halide and recovering vaporized chloride of said metal.

15. A method of removing iron chloride from vaporized tin chloride to remove suspended iron chloride which comprises washing the vapor with a normally liquid halide and thereafter recovering the vaporized tin chloride.

16. A method of condensing a mixture of vaporized metallic halides which comprises washing the vapor with a normally liquid substantially anhydrous liquid halide to condense one of said halides while retaining a major portion of another said halide in the vapor state.

17. A method of separating vaporized iron chloride from vaporized tin chloride which comprises washing the vapor with a liquid halide to condense iron chloride while retaining a major portion of the tin chloride in the vapor state.

18. A method of separating iron chloride from a vapor mixture of iron chloride and a vaporized normally liquid metallic chloride which comprises washing the vapor with a liquid halide to condense iron chloride while retaining a major portion of said metallic chloride in the vapor state.

ALPHONSE PECHUKAS.